(12) United States Patent
Witschnig et al.

(10) Patent No.: US 9,767,401 B2
(45) Date of Patent: Sep. 19, 2017

(54) RADIO COMMUNICATION PROCESSOR ARRANGEMENT

(71) Applicant: Infineon Technologies AG, Neubiberg (DE)

(72) Inventors: Harald Witschnig, Villach (AT); Magdalena Forster, Villach (AT); Gerald Holweg, Graz (AT); Walter Kargl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/259,332

(22) Filed: Apr. 23, 2014

(65) Prior Publication Data

US 2014/0319229 A1    Oct. 30, 2014

(30) Foreign Application Priority Data

Apr. 24, 2013    (DE) .................. 10 2013 104 148

(51) Int. Cl.
*G06K 19/06*    (2006.01)
*G06K 19/07*    (2006.01)
*G06K 19/073*    (2006.01)

(52) U.S. Cl.
CPC ....... *G06K 19/0723* (2013.01); *G06K 19/073* (2013.01); *G06K 19/0704* (2013.01); *G06K 19/0709* (2013.01); *G06K 19/0724* (2013.01)

(58) Field of Classification Search
USPC ............................ 235/492, 451; 340/10.1
See application file for complete search history.

(56) References Cited

U.S. PATENT DOCUMENTS

| | | | |
|---|---|---|---|
| 2006/0097059 A1* | 5/2006 | Miyazaki ...................... 235/492 |
| 2007/0048604 A1 | 3/2007 | Gaillard et al. | |
| 2008/0003492 A1* | 1/2008 | Bates .................. H01M 2/0207 |
| | | | 429/66 |
| 2008/0210762 A1* | 9/2008 | Osada et al. .................. 235/492 |
| 2010/0181384 A1* | 7/2010 | Matsuzaki ..................... 235/492 |
| 2011/0278363 A1 | 11/2011 | Pirk et al. | |
| 2013/0128488 A1* | 5/2013 | Forster ............. H01M 10/0436 |
| | | | 361/820 |
| 2014/0079997 A1* | 3/2014 | Rosso ................. H01M 4/0421 |
| | | | 429/213 |

FOREIGN PATENT DOCUMENTS

| | | |
|---|---|---|
| CN | 1883076 A | 12/2006 |
| CN | 101401238 A | 4/2009 |
| CN | 104040767 A | 9/2014 |
| DE | 102004039651 A1 | 3/2006 |
| DE | 102010028868 A1 | 11/2011 |

(Continued)

OTHER PUBLICATIONS

German office action dated Mar. 28, 2014 received for corresponding German application 10 2013 104 148.5.

(Continued)

*Primary Examiner* — Ahshik Kim
(74) *Attorney, Agent, or Firm* — Viering, Jentschura & Partner mbB

(57) ABSTRACT

In accordance with various embodiments, a radio communication processor arrangement including a chip and a battery integrated into the chip is provided.

17 Claims, 7 Drawing Sheets

(56) References Cited

FOREIGN PATENT DOCUMENTS

| WO | 2007105196 A1 | 9/2007 |
| WO | 2012160315 A1 | 11/2012 |
| WO | 2013075810 A1 | 5/2013 |

OTHER PUBLICATIONS

Bohne L., Integrierte 3D-Lithium-Ionen-Dünnschichtbatterien: Dünnschichtkathoden auf strukturierten Substraten und elektrochemische Eigenschaften, TU Darmstadt [Dissertation], 2012. Internet: URL: <http://tuprints.ulb.tu-darmstadt.de/2957/>, Aug. 20, 2012.

* cited by examiner

RADIO COMMUNICATION PROCESSOR ARRANGEMENT

CROSS-REFERENCE TO RELATED APPLICATION

This application claims priority to German Patent Application Serial No. 10 2013 104 148.5, which was filed Apr. 24, 2013, and is incorporated herein by reference in its entirety.

TECHNICAL FIELD

Various embodiments relate generally to radio communication processor arrangements.

BACKGROUND

Radio communication processor arrangements, such as contactless smart cards and RFID (radio frequency identification) tags, typically supply their components with energy which they take up from an electromagnetic field, which is generated for example by a corresponding reader. However, such energy transfer to a radio communication processor arrangement can be impaired by various effects at least at times. Examples thereof include the mutual influencing of a plurality of smart cards or RFID tags with respect to one another and field holes on account of multipath propagation and destructive interference. A stable and continuous energy supply of components of a radio communication processor arrangement is desirable.

SUMMARY

In accordance with various embodiments, a radio communication processor arrangement including a chip and a battery integrated into the chip is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
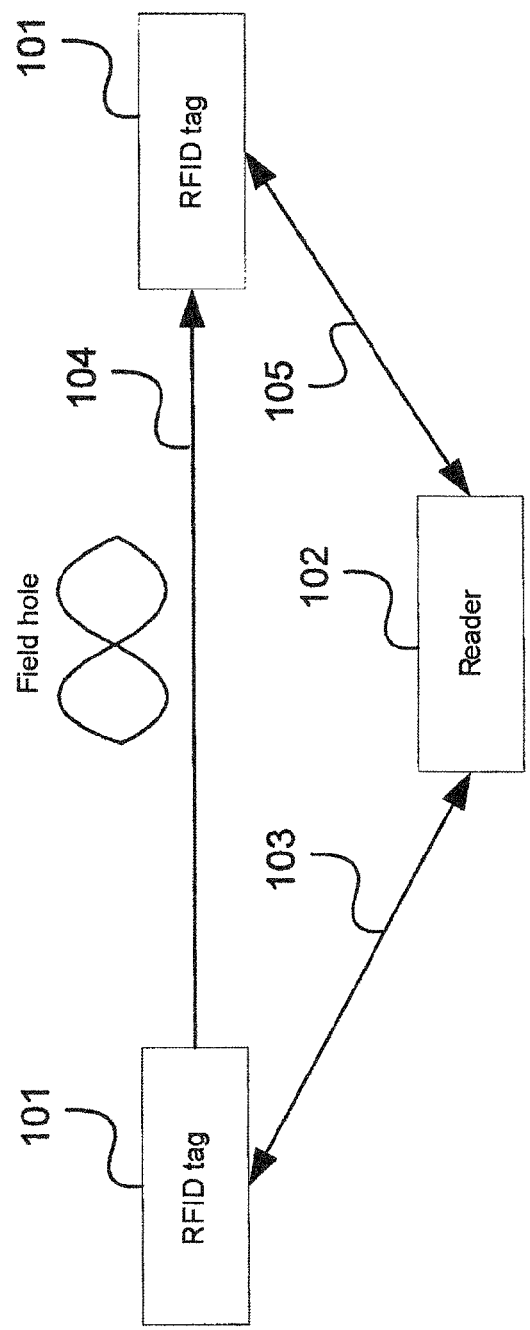
FIG. 1 illustrates an RFID tag read-out process.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Radio communication processor arrangements such as contactless smart cards and passive RFID (radio-frequency identification) tags, for example, in terms of their function, typically rely on supply with energy by a reader. However, a series of effects can impair this energy transfer to such a communication arrangement, with the result that its function is no longer ensured and, accordingly, for example, the communication between communication processor arrangement and reader is interrupted.

Such an undersupply can be brought about by various effects, such as, for example, detuning, type A pauses for HF (high-frequency) communication processor arrangements, i.e. communication processor arrangements which take up energy and communicate in the HF range, or field gaps/multipath propagation for UHF (ultrahigh-frequency) communication processor arrangements, i.e. communication processor arrangements which take up energy and communicate in the UHF range.

In the case of HF communication processor arrangements, for example, closely coupled (i.e. in a wallet) passive contactless smart cards can mutually influence one another to such a great extent that an energy supply on the part of a reader is not possible at least at times, and failures occur.

The cause of such detuning is typically that each card per se constitutes an RLC resonant circuit and an energy supply is ensured only by targeted sharpness of resonance. As a result of the mutual influencing, shifts in the resonant frequency occur and the required supply voltage is no longer ensured.

Moreover, the type of modulation can influence the energy supply. If a modulation phase takes place for an excessively long time, for example, then a smart card or an RFID tag can possibly no longer be supplied with energy.

In order to reduce the effect as a result of the mutual influencing of communication processor arrangements, the quality factor of the RLC resonant circuits of the communication processor arrangements can be reduced, thereby achieving a lower sensitivity with respect to a resonance shift. However, the consequence of such a reduction of the quality factor is also a reduced communication range.

In the case of a UHF smart card (underlying frequencies: 800-900 MHz), there is the effect of multipath propagation, which can lead to field holes and field dips. The case can occur that a communication processor arrangement (e.g. an RFID tag) is situated in a field hole. Accordingly, the case can occur that an RFID tag is not permanently supplied with energy. This can have the effect that the reading rate of the RFID system (consisting of reader and RFID tags) is reduced and the throughput is reduced if RFID tags that have already been read move through a field hole and consequently have to be reread.

FIG. 1 illustrates an RFID tag read-out process.

It is assumed that an RFID tag 101 communicates with a reader 102 at a first point in time (symbolized by a first arrow 103) and then moves through a field hole (arrow 104). Since the RFID tag 101 is not supplied with energy in the field hole, the information stored in the communication is lost to said tag and, consequently, the case can occur that it communicates with the reader anew (arrow 105).

By setting a status bit (e.g. a DESP, standing for data exchange status bit), it is possible for an RFID tag to be identified as having already been read, such that, for example, repeated reading is avoided. However, for this purpose it is necessary that the status bit remains set for the time duration of traversing a field hole, but is reset, for example, if an RFID port was traversed.

In accordance with various embodiments, provision is made of an integrated battery for maintaining (e.g. continuing) a function (e.g. a communication) of a radio communication processor arrangement, such as a smart card or an RFID tag, for example. By way of example, in the case of excess energy (e.g. in the case where the radio communication processor arrangement is in spatial proximity to the reader), the excess energy (e.g. energy not consumed by components of the radio communication processor arrangement) is used for charging the battery. Consequently, by way of example, energy is not dissipated in the form of heat (which can also lead to material loading), but rather is stored in the form of charge energy. Various embodiments are described below with reference to FIG. 2.

Figure 2:
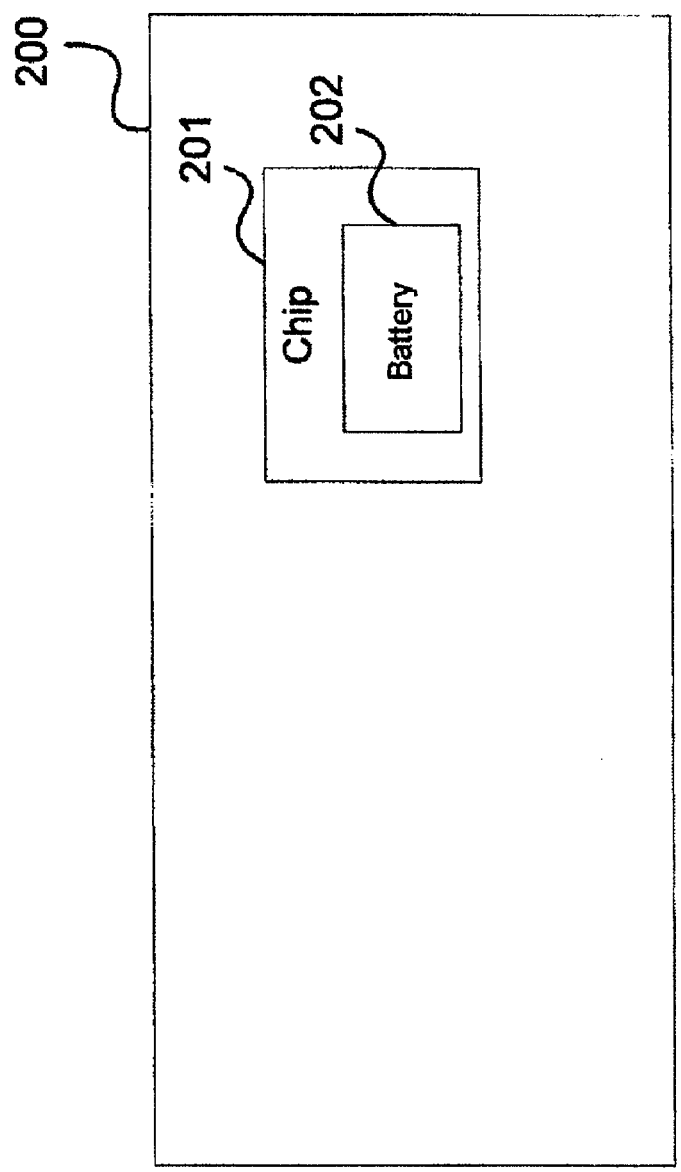
FIG. 2 shows a radio communication processor arrangement in accordance with various embodiments.

FIG. 2 shows a radio communication processor arrangement in accordance with various embodiments.

The radio communication processor arrangement 200 includes a chip 201 and a battery 202 integrated into the chip.

In other words, an integrated battery is provided, which can ensure the function of the radio communication processor arrangement if the energy taken up, for example via an antenna, does not suffice for supplying the radio communication processor arrangement.

By way of example, energy dips owing to mismatch effects, supply holes as a result of multipath propagation, modulation-dictated dependencies, etc., are compensated for by the provision of energy by the integrated battery.

The battery is, for example, an integrated battery or an integrated charge store. The battery may also be used for improving the range (semi-actively or actively). The radio communication processor arrangement can comprise an integrated antenna. The radio communication processor arrangement may be configured to use different frequencies and methods (e.g. HF communication for near field communication, UHF for communication with a high range, passive communication or semi-active communication). For communication with a high range, a purely active variant may also be possible (in which the radio communication processor arrangement e.g. wakes up from an energy-saving state and actively transmits). The radio communication processor arrangement can comprise one or a plurality of integrated sensors, for example, and the battery can be used to supply the one or the plurality of sensors with energy.

The radio communication processor arrangement is a smart card or an RFID tag, for example.

The radio communication processor arrangement may include a radio communication processor, for example, which may be configured to process received digital signals or digital signals to be transmitted.

By way of example, the radio communication processor is designed for HF communication or UHF communication.

The radio communication processor arrangement includes one or a plurality of components to be supplied, for example.

In accordance with various embodiments, the radio communication processor arrangement includes an antenna and a first supply circuit, which is configured to supply the one or the plurality of components to be supplied by means of energy received from the antenna, and a second supply circuit, which is configured to supply the one or the plurality of components to be supplied by means of the battery, if the energy received by the antenna does not suffice for supplying the one or the plurality of components to be supplied.

By way of example, the first supply circuit is configured to charge the battery if the antenna receives more energy than is consumed by the one or the plurality of components to be supplied.

The one or the plurality of components to be supplied have an integrated circuit, for example.

The integrated circuit is, for example, an integrated processing logic or an integrated memory.

By way of example, the integrated circuit is integrated into the chip.

The one or the plurality of components to be supplied have the radio communication processor, for example.

In accordance with various embodiments, the radio communication processor arrangement is an RFID tag and the component to be supplied is a memory configured to store the information as to whether the RFID tag has already been read by a reader.

The radio communication processor arrangement may be a smart card or an RFID tag.

The chip may be a smart card module, for example.

The battery may be a secondary cell, for example.

The battery may have a solid or a liquid electrolyte.

The battery may be regarded as a charge store. A "battery" may also be understood to mean an individual primary cell or secondary cell.

Various embodiments are described in greater detail below.

Figure 3:
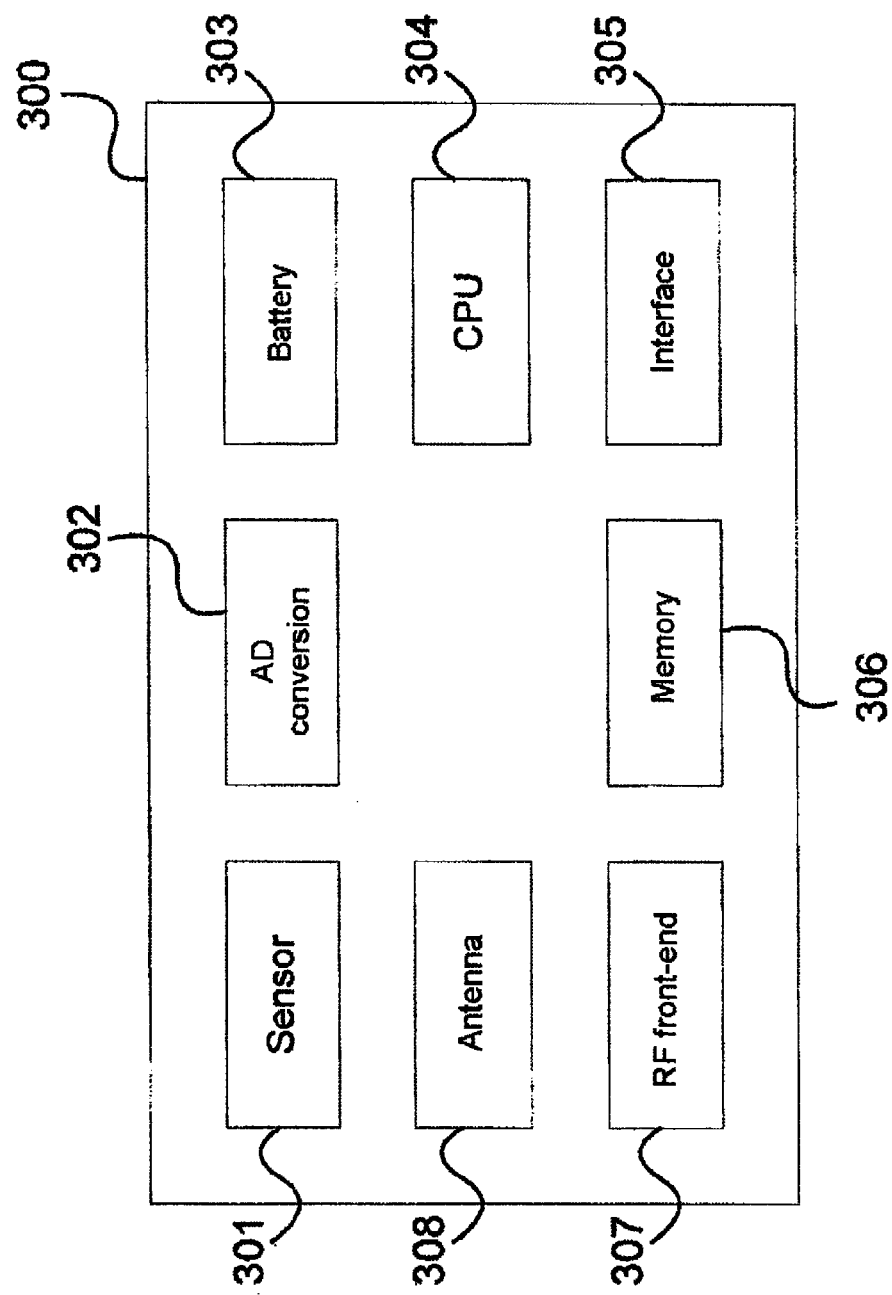
FIG. 3 shows a radio communication processor arrangement in accordance with various embodiments.

FIG. 3 shows a radio communication processor arrangement 300 in accordance with various embodiments.

In this example, the radio communication processor arrangement, for example a smart card, includes one or a plurality of sensors 301, an A/D converter 302, an integrated battery 303, a (for example secure) central processing unit (CPU) 304, an interface 305, a nonvolatile memory 306, radio front-end components 307 and an antenna 308 (which can optionally be an integrated battery).

The integrated battery 303 is integrated into a chip. One example of an integrated battery is illustrated in FIG. 4.

Figure 4:
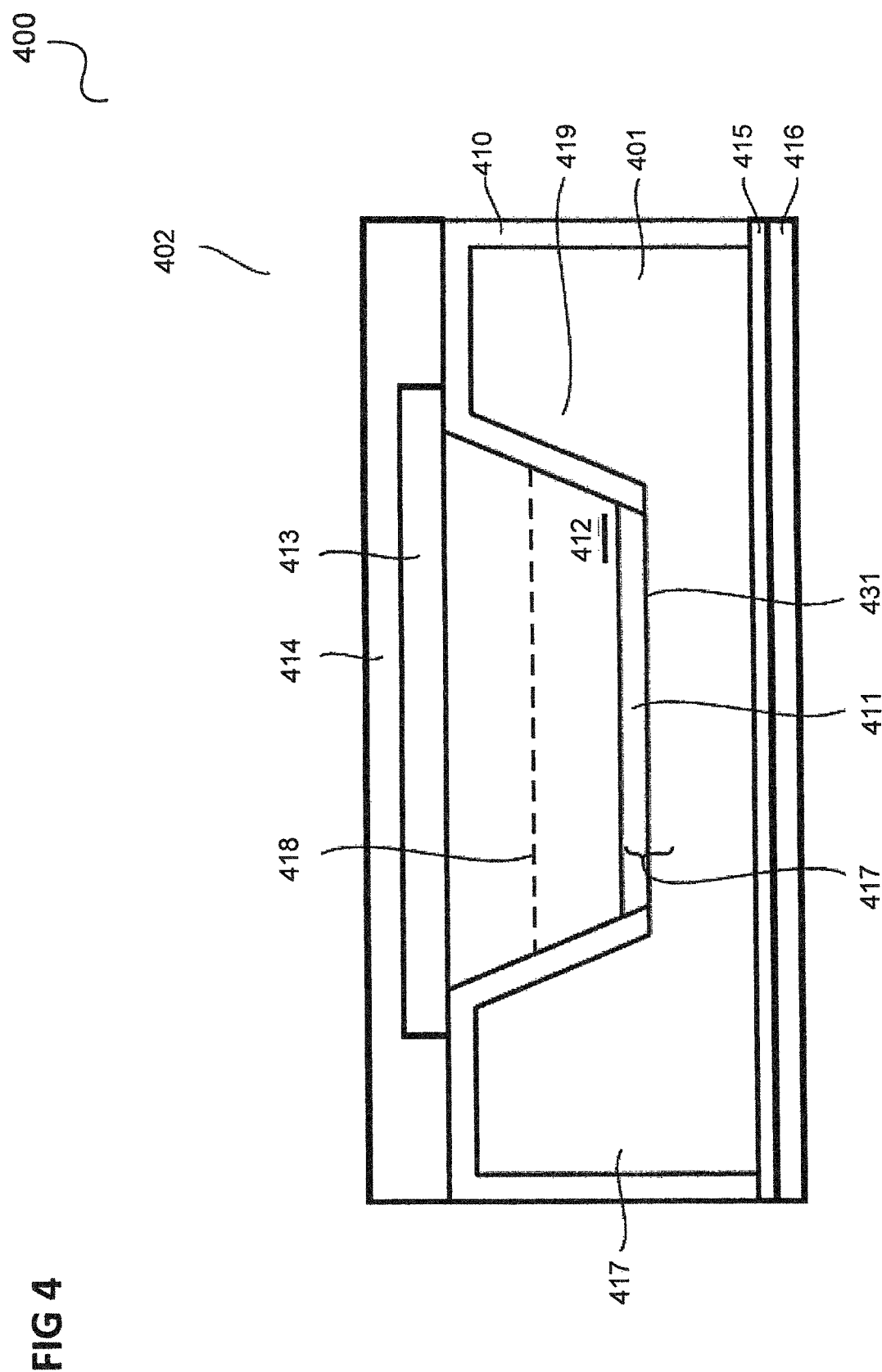
FIG. 4 shows a section through a lithium battery in accordance with various embodiments.

FIG. 4 shows a section through a lithium battery 400 in accordance with various embodiments.

The lithium battery 400 may have a cathode 413, an anode 417, a separating element 418 arranged between the cathode 413 and the anode 417, an electrolyte 412 and a substrate 419. The anode 417 is arranged above the substrate 419. The anode may be embodied for example as part of the substrate 419. Alternatively, the anode 417 may be formed by an additional layer embodied above the substrate 419. The anode 417, the separating element 418 and the electrolyte 412 may be arranged in a trench 431 in a silicon body 401 that forms the substrate.

By way of example, the anode 417 may form a wall of the trench 431. The trench 431 may have sidewalls and a base, and the anode 417 may form the base of the trench 431. The anode 417 may furthermore have a thin metal layer 411.

The anode may include monocrystalline, polycrystalline or amorphous silicon. The silicon may be doped with a dopant such as, for example, boron, arsenic or phosphorus. The active silicon surface of the anode 417 may be planar or structured. By way of example, three-dimensional structures such as pyramids or trenches may be embodied on the surface of the anode. The thin metal layer 411 may be embodied at the top side of the anode 417 such that it contacts the electrolyte. The metal layer 411 may include for example silver, aluminum, gold, palladium or platinum. Metals which form an alloy with lithium may be used. Further examples are Zn, Cd, Hg, B, Ga, In, Th, C, Si, Ge, Sn, Pb, As, Sb, Bi, Se and Te. The thickness of the metal layer 411 may be less than 100 nm and, for example, more than 1 nm.

Lithium-ion battery materials such as $LiCoO_2$, $LiNiO_2$, $LiNi_{0.85}Co_{0.1}Al_{0.05}O_2$, $LiNi_{0.33}Co_{0.33}Mn_{0.33}O_2$, $LiMn_2O_4$ spinel and $LiFePO_4$ may be used for the cathode. The electrolyte 412 may include lithium-ion battery electrolytes such as, for example, salts such as $LiPF_6$, $LiBF_4$ in anhydrous aprotic solvents such as, for example, propylene carbonate, dimethyl carbonate or 1,2-dimethoxymethane, ethylene carbonate, diethyl carbonate and other polymers, for example polyvinylidene fluoride (PVDF) or polyvinylidene fluoride hexafluoropropene (PVDF-HFP) or other polymers, $Li_3PO_4N$ and others.

The separating element 418 separates the anode 417 and the cathode 413 spatially and electrically from one another. The separating element 418 may be permeable to ions. The separating element 418 is, for example, a non-woven structure composed of materials such as fiberglass, polyethylene or microporous materials.

A seal 414 may be embodied above the cathode 413, said seal encapsulating the battery for example in a water-tight and air-tight fashion. The seal 414 may be composed of polyimide, for example. A passivation layer 410 is embodied above the parts of the silicon body 401 which do not form the anode 417. By way of example, the sidewalls of the trench 431 are covered with the passivation layer. Moreover, the outer sides of the substrate 419 are covered with the passivation layer 410. The passivation layer may include various materials such as silicon oxide, silicon nitride, polymers, imides, polyethylene, metals and combinations of these materials. The passivation layer 410 may prevent the diffusion of lithium atoms into adjacent components.

Conductive layers 415, 416 may be embodied on the rear side of the battery 402. By way of example, a metal layer 416, such as e.g. composed of copper, can be embodied on the rear side. A boundary layer, for example composed of TiW, is embodied between the anode 417 and the metal layer 416. The thickness of the boundary layer may be between 50 nm and 150 nm, for example. The metal layer (e.g. copper layer) may be thicker than 500 nm, for example 1 µm or more.

Alternatively, the current can be carried away via a buried layer or a channel, for example composed of polysilicon or doped silicon.

Figure 5:
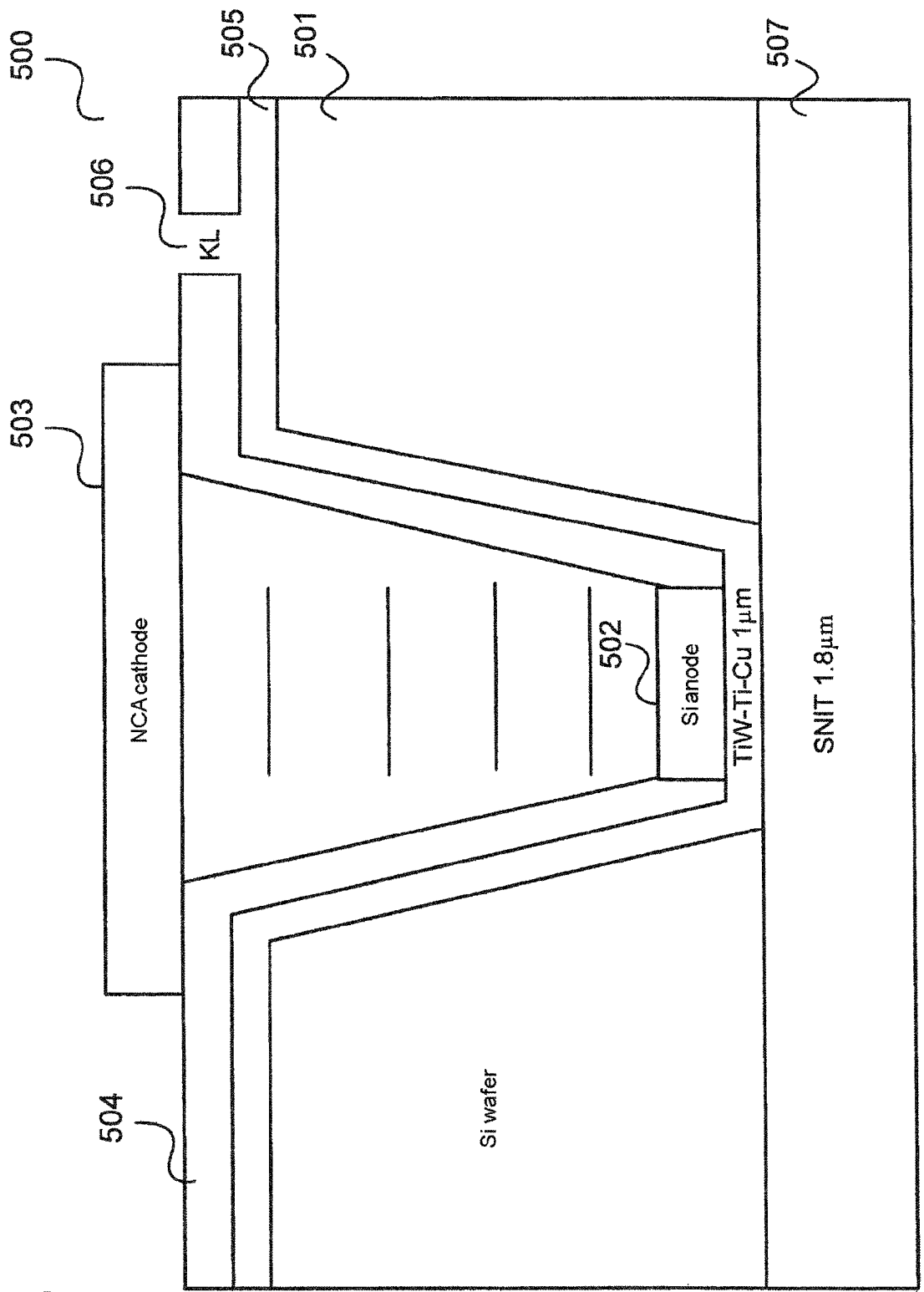
FIG. 5 shows an integrated battery in accordance with various embodiments.

A further example of the integrated battery 303 is illustrated in FIG. 5.

FIG. 5 shows an integrated battery 500 in accordance with various embodiments.

The battery 500 is embodied in a silicon wafer 501. It has a silicon anode 502 and a nickel-cobalt (NCA) cathode 503. The anode 502, the cathode 503 and a passivation layer 504 form a space filled with an electrolyte (for example one of the electrolytes mentioned above). A TiW—Ti—Cu stack 505 is embodied between the passivation layer 504 and the silicon wafer material, which stack can be contacted by means of a contact hole 506 in the passivation layer 504. A silicon nitride layer 507 is provided at the underside of the silicon wafer 501.

Table 1 shows, in the second column, exemplary desired data for a battery for supplying radio communication processor arrangements and, in the third column, data such as can be achieved with the structure from FIG. 5.

TABLE 1

| Capacity | 360 µAh | >2 mAh |
| Current supplied | 30 µA | 80 µA-1 mA |
| Voltage supplied | 1-3 V | 3.6-4 V |
| Temperature range | −40 to 150° C. | 0 to 45° C. or 70° C. |
| Dimensions | 4 × 4 × 0.2 mm$^3$ | 4 × 4 × 0.2 mm$^3$ |

Table 2 shows the data which arise as a result of scaling correspondingly for an integrated battery for supplying a smart card or an RFID tag.

TABLE 2

|  | Smart card | RFID tag |
| --- | --- | --- |
| Size | 6 mm$^2$ | 1 mm$^2$ |
| Capacity | 0.75 mAh | 0.125 mAh |
| Costs | 7.5 cents | 1.25 cents |
| Current | 1.875 mA | 0.3125 mA |

The integrated battery 303 can be used e.g. for supplying the components of the radio communication processor arrangement, for example a smart card, if a second smart card, upon approaching the smart card, leads to a mismatch in the first smart card and, as a result, the energy fed to the smart card decreases.

Figure 6:
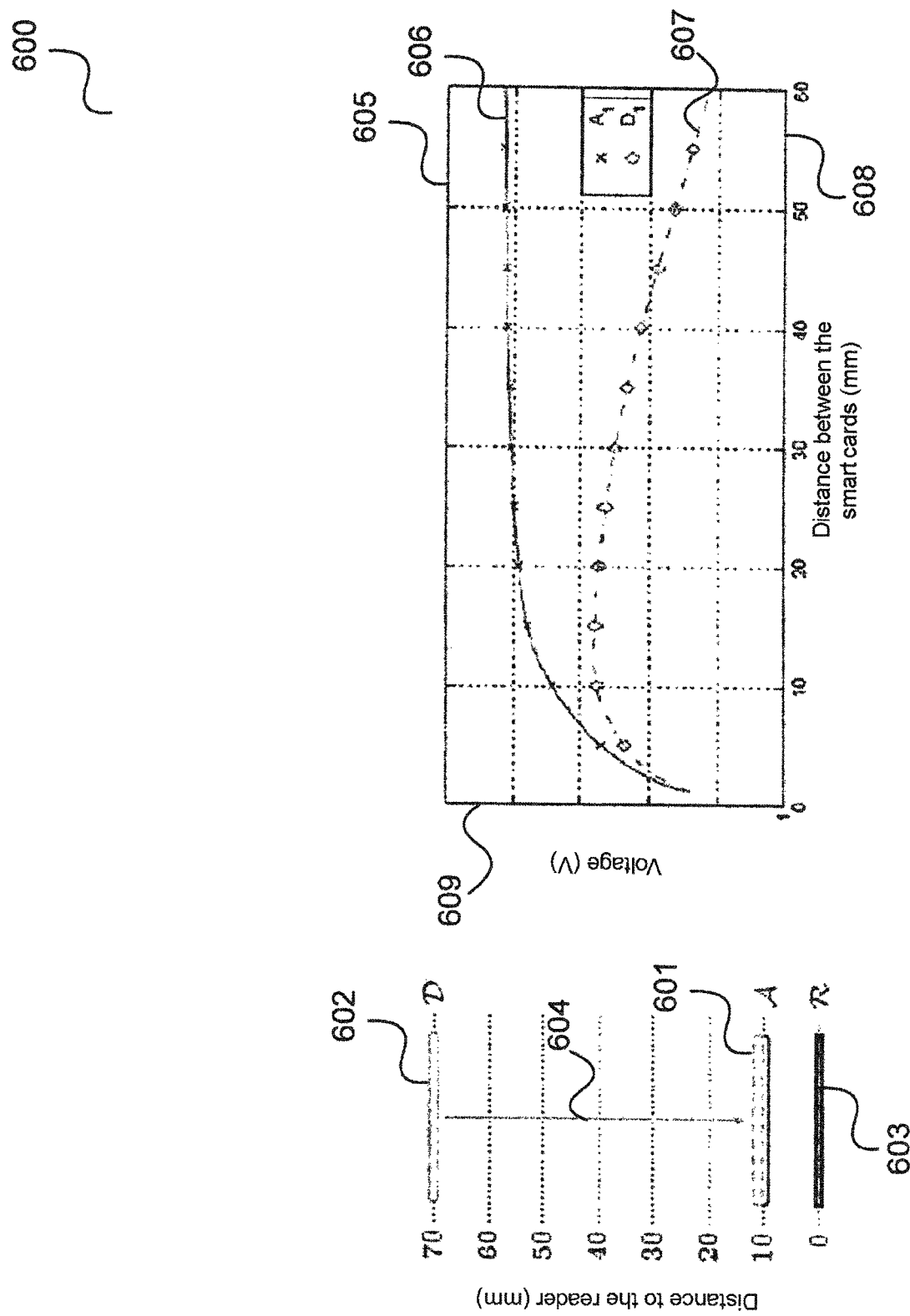
FIG. 6 shows an example of a decrease in the energy fed to a first smart card upon the approach of a second smart card.
Figure 7:
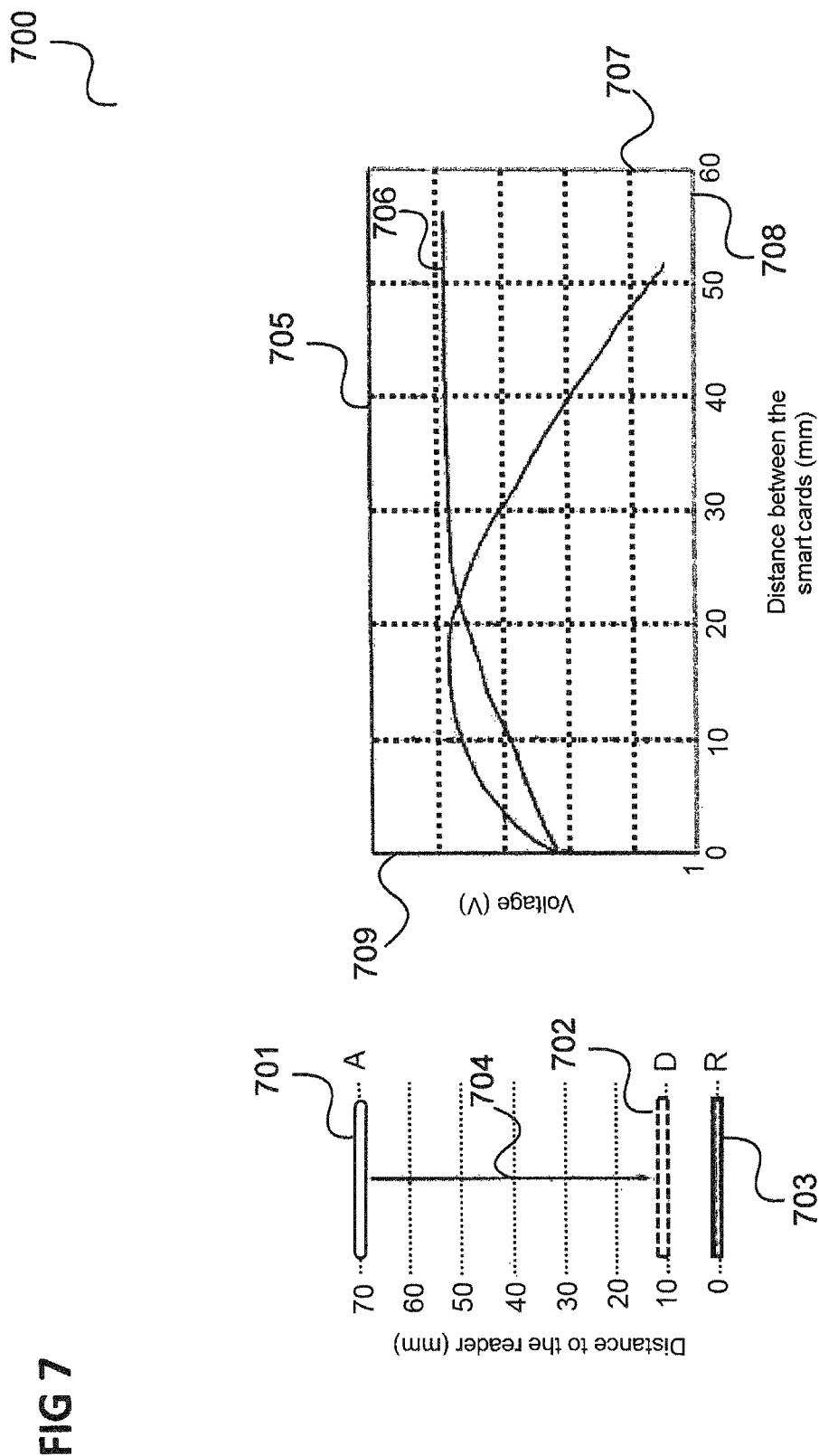
FIG. 7 a further example of a decrease in the energy fed to a first smart card upon approaching a second smart card.

Examples of such a scenario are illustrated in FIG. 6 and FIG. 7.

FIG. 6 shows an example of a decrease in the energy fed to a first smart card upon approaching a second smart card.

It is assumed that the first smart card 601 is situated at a distance of 10 mm from a reader 603 and the second smart card 602 approaches the position of the first smart card 601 (illustrated by the arrow 604).

In this example, the reader transmits at 13.56 MHz, the first smart card 601 operates at (i.e. has the resonant frequency of) 13.56 MHz and the second smart card 602 operates at 14.20 MHz.

A diagram 605 shows in a first curve 606 the voltage induced at the antenna of the first smart card 601 by the reader as a function of the distance between the second smart card 602 and the first smart card 601, and in a second curve 607 the voltage induced at the antenna of the second smart card 602 by the reader as a function of the distance between the second smart card 602 and the first smart card 601.

The distance between the smart cards is plotted along a distance axis 608 and the voltage is plotted along a voltage axis 609.

In this example, the induced voltage decreases in both smart cards starting from a certain proximity such that the resonance system comprising reader 603 and first smart card 601 is influenced. The voltage induced in the second smart card 602 rises as the distance decreases until the mismatch leads to a voltage drop in both smart cards 601, 602. If a technology-dependent voltage is undershot, then the energy supply of the cards is no longer ensured and a communication between the reader 603 and the smart cards 601, 602 is interrupted. Accordingly, in accordance with one embodiment, the integrated battery 303 is used to supply the smart card 601 and/or the smart card 602 with energy and thus to maintain the communication between the smart card 601 and/or the smart card 602 and the reader 603 in such a scenario.

FIG. 7 shows a further example of a decrease in the energy fed to a first smart card when approaching a second smart card.

In this example, it is assumed that the second smart card 702 is situated at a distance of 10 mm from the reader 603, and the first smart card 701 approaches the position of the second smart card 702 (illustrated by the arrow 704).

As in the example in FIG. 6, it is assumed that the reader transmits at 13.56 MHz, the first smart card 701 operates at 13.56 MHz and the second smart card 702 operates at 14.20 MHz.

A diagram 705 shows in a first curve 706 the voltage induced at the antenna of the second smart card 702 by the reader as a function of the distance between the first smart card 701 and the second smart card 702, and in a second curve 707 the voltage induced at the antenna of the first smart card 701 by the reader as a function of the distance between the first smart card 701 and the second smart card 702.

The distance between the smart cards is plotted along a distance axis 708 and the voltage is plotted along a voltage axis 709.

In this scenario, the more distant smart card (first smart card 701) at times is supplied with energy better than the closer smart card (second smart card 702). In this case, too, the communication between the reader 703 and the smart cards 701, 702 can terminate. Accordingly, in accordance with one embodiment, the integrated battery 303 is used to supply the smart card 701 and/or the smart card 702 with energy and thus to maintain the communication between the smart card 701 and/or the smart card 702 and the reader 703 in such a scenario.

In the case of UHF, for example of a UHF RFID tag, an integrated battery may be used, for example, to maintain a status bit, which indicates whether the RFID tag has already been read, in the event of the failure of the energy supply via the antenna.

Both in the HF case and in the UHF case, an integrated battery can ensure the supply with energy in the meantime. A supply with simple capacities is not sufficient in many scenarios. With an integrated battery as described with reference to FIG. 4 or FIG. 5, for example, it is possible to achieve high energy density and functional parameters which are suitable for ensuring radio communication processor arrangements such as smart cards and RFID tags.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication processor arrangement comprising:
   a chip;
   a battery integrated into the chip;
   wherein the chip comprises a substrate, wherein the substrate comprises a cavity having a bottom and sidewalls, and wherein an anode of the battery is disposed at least at the bottom of the cavity;
   an antenna;
   a first supply circuit, which is configured to supply the one or the plurality of components to be supplied by means of energy received from the antenna, and
   a second supply circuit, which is configured to supply the one or the plurality of components to be supplied by means of the battery, if the energy received by the antenna does not suffice for supplying the one or the plurality of components to be supplied.

2. The radio communication processor arrangement of claim 1,
   wherein the radio communication processor arrangement is a smart card or an RFID tag.

3. The radio communication processor arrangement of claim 1, further comprising:
   a radio communication processor configured to process received digital signals or digital signals to be transmitted.

4. The radio communication processor arrangement of claim 3,
   wherein the radio communication processor is configured for HF communication or UHF communication.

5. The radio communication processor arrangement of claim 1, further comprising:
   one or a plurality of components to be supplied.

6. The radio communication processor arrangement of claim 1,
   wherein the first supply circuit is configured to charge the battery if the antenna receives more energy than is consumed by the one or the plurality of components to be supplied.

7. The radio communication processor arrangement of claim 5,
   wherein the one or the plurality of components to be supplied have an integrated circuit.

8. The radio communication processor arrangement of claim 7,
   wherein the integrated circuit is an integrated processing logic or an integrated memory.

9. The radio communication processor arrangement of claim 7,
   wherein the integrated circuit is integrated into the chip.

10. The radio communication processor arrangement of claim 7,
    wherein the one or the plurality of components to be supplied have a radio communication processor.

11. The radio communication processor arrangement of claim 7,
    wherein the radio communication processor arrangement is an RFID tag and the component to be supplied is a memory configured to store the information as to whether the RFID tag has already been read by a reader.

12. The radio communication processor arrangement of claim 1,
    wherein the chip is a smart card module.

13. The radio communication processor arrangement of claim 1,
    wherein the battery has a liquid electrolyte, a solid electrolyte, and combinations thereof.

14. The radio communication processor arrangement of claim 1, wherein the chip comprises a substrate, and wherein the anode is formed as an additional layer above the substrate.

15. The radio communication processor arrangement of claim 1, further comprising a doped silicon comprising a dopant selected from the group consisting of boron, arsenic, phosphorous, and combinations thereof.

16. The radio communication processor arrangement of claim 1, wherein the anode of the battery comprises a silicon selected from the group consisting of monocrystalline silicon, polycrystalline silicon, amorphous silicon, doped silicon, and combinations thereof.

17. A radio communication processor arrangement comprising:
- a chip;
- a battery integrated into the chip;
wherein the chip comprises a substrate, and wherein the substrate comprises an anode of the battery; wherein the battery is configured as a trench within a substrate of the chip; wherein the trench comprises a bottom side, sidewalls, and a top side wherein the anode is configured at the bottom side of the trench, a cathode is configured as the top side of the trench, and an electrolyte is disposed within the trench; and
- an antenna;
- a first supply circuit, which is configured to supply the one or the plurality of components to be supplied by means of energy received from the antenna, and
- a second supply circuit, which is configured to supply the one or the plurality of components to be supplied by means of the battery, if the energy received by the antenna does not suffice for supplying the one or the plurality of components to be supplied.

* * * * *